Patented Jan. 2, 1945

2,366,240

UNITED STATES PATENT OFFICE 2,366,240

WATER-SOLUBLE HIGH MOLAL OXYALKYLATED ESTERS, AND METHOD OF MAKING SAME

Melvin De Groote, University City, and Bernhard Keiser, Webster Groves, Mo., assignors to Petrolite Corporation, Ltd., Wilmington, Del., a corporation of Delaware No Drawing. Original application July 7, 1941, Serial No. 401,376. Divided and this application March 9, 1943, Serial No. 478,587

12 Claims. (Cl. 260—404.5)

This invention relates to a new chemical product, our present application being a division of our pending application for patent, No. 401,376, filed July 7, 1941, for Process for breaking petroleum emulsions, which subsequently matured as U. S. Patent No. 2,324,488, dated July 20, 1943.

One object of our invention is to provide a new chemical product or compound that is particularly adapted for use as a demulsifier in the resolution of crude oil emulsions.

Another object of our invention is to provide a practicable method for manufacturing said new chemical product or compound.

Although one of the primary objects of our invention is to provide a new compound or composition of matter that is an efficient demulsifier for crude oil emulsions of the water-in-oil type, the said compound or composition of matter may be employed in other arts, as hereinafter indicated.

The new chemical compound or composition of matter herein described, is exemplified by the acidic, or preferably, neutral ester derived by complete esterification of one mole of a polyalkylene glycol of the kind hereinafter described, with two moles of a fractional ester derived from a hydroxylated material of the kind herein described, and a polybasic carboxy acid having not over six carbon atoms.

If a hydroxylated material, indicated for the sake of convenience by the formula T.OH, in which T is an alcoholic residue, is reacted with a polybasic carboxy acid, which, similarly, may conveniently be of the dibasic type, and indicated by the formula HOOC.D.COOH, in which D is a dicarboxy acid residue, then the fractional ester obtained by reaction between equimolar quantities may be indicated by the following formula:

HOOC.D.COO.T

The polyethylene glycol may be characterized by materials of the kind such as heptaethylene glycol, octaethylene glycol, nonaethylene glycol, decaethylene glycol, to and including heptadecaethylene glycol. For convenience these polyethylene glycols may be indicated by the following formula

in which $m$ varies from 7 through 17.

Instead of polyethylene glycols, one may use polypropylene glycols, or polybutylene glycols. Thus, for convenience, in the broadest aspect, the polyalkylene glycols employed may be indicated by the following formula:

in which $m$ has its previous significance, and $n$ represents a numeral varying from 2 to 4.

Thus, the bulk of the materials herein contemplated, particularly for use as demulsifiers, may be indicated within certain variations, as hereinafter stated, by the neutral ester derived by esterification of one mole of a glycol of the kind above described, with two moles of a fractional ester of the kind previously described. The formation of the compound may be indicated by the following reaction, although obviously, it is immaterial what particular procedure is employed to produce the particular chemical compound or product:

T.OOC.D.COOH + OH($C_2H_4O$)$_m$H + HOOC.D.COO.T →
T.OOC.D.COO($C_2H_4O$)$_{m-1}C_2H_4$.OOC.D.COO.T

As indicated previously, the polybasic acids employed are limited to the type having not more than six carbon atoms, for example, oxalic, malonic, succinic, glutaric, and adipic. Similarly, one may employ acids such as fumaric, maleic, glutaconic, and various others, including citric, malic, tartaric, and the like. The selection of the particular tribasic or dibasic acid employed is usually concerned largely with convenience of manufacture of the finished ester, and also of the price of the reactants. Generally speaking, the higher the temperature employed, the easier it is to obtain large yields of the esterified product. Although oxalic acid is comparatively cheap, it decomposes somewhat readily at slightly above the boiling point of water. For this reason, it is more desirable to use an acid which is more resistant to pyrolysis. Similarly, when a polybasic acid is available in the form of an anhydride, such anhydride is apt to produce the ester with greater ease than the acid itself. For this reason maleic anhydride is particularly adaptable; and also, everything else considered, the cost is comparatively low on a per molar basis, even though somewhat higher on a per pound basis. Succinic acid or the anhydride has many of the attractive qualities of maleic anhydride; and this is also true of adipic acid. For purposes of brevity, the bulk of the compounds hereinafter illustrated will refer to the use of maleic anhydride, although it is understood that any other suitable polybasic acid may be employed. Furthermore, for purposes of convenience, reference is made to the use of polyethylene glycols. As has been previously indicated, such glycols can be replaced by suitable polypropylene or polybutylene compounds.

As far as the range of oxyalkylated compounds employed as reactants is concerned, it is our preference to employ those having approximately 8-12 oxyalkylene groups, particularly 8-12 oxyethylene groups. Our preference to use the oxyethylated compounds is due largely to the fact that they are commercially available, and particularly so in two desirable forms. The most desirable form is the so-called nonaethylene glycol, which, although consisting largely of nonaethylene glycol, may contain small amounts of heptaethylene and octaethylene glycols, and possibly minor percentages of the higher homologs. Such glycols represent the upper range of distillable glycols; and they may be conveniently referred to as "upper distillable ethylene glycols." There is no particularly good procedure for making a sharper separation on a commercial scale; and it is understood that mixtures of one or more of the glycols may be employed, as well as a single glycol. As pointed out, it is particularly preferred to employ nonaethylene glycol as commercially available, although it is understood that this product contains other homologs, as indicated.

Substantially as desirable as the upper distillable polyethylene glycols, are the lower non-distillable polyethylene glycols. These materials are available in the form of a waxy water-soluble material, and the general range may vary somewhat from deca- to tetradecaethylene glycol. As is well understood, the method of producing such glycols would cause some higher homologs to be formed; and thus, even in this instance, there may be present some oxyethylene glycols within the higher range above indicated. One need not point out that these particular compounds consist of mixtures, and that in some instances, particularly desirable esters are obtained by making mixtures of the liquid nonaethylene glycol with the soft, waxy, lower non-distillable polyethylene glycols. For the sake of convenience, reference in the examples will be to nonaethylene glycol; and calculations will be based on a theoretical molecular weight of 414. Actually, in manufacture, the molecular weight of the glycol employed, whether a higher distillable polyethylene glycol or a lower non-distillable polyethylene glycol, or a mixture of the same, should be determined and reaction conducted on the basis of such determination, particularly in conjunction with the hydroxyl or acetyl value.

It has been previously pointed out that it is immaterial how the compounds herein contemplated are manufactured, although we have found it most desirable to react the selected glycol or mixtures of glycols with maleic anhydride in a ratio of two moles of the anhydride for one mole of the glycol. Under such circumstances, we have found little tendency to form longer chain polymers; and in fact, the product of reaction, if conducted at reasonably low temperatures, appears to be largely monomeric. For convenience, such intermediate fractional ester may then be considered as a dibasic or polybasic acid. One mole of the intermediate fractional ester so obtained is then reacted with two moles of the alcoholic material of the kind subsequently described.

It is to be noted, however, that if one prepares a fractional acidic ester, then if two moles of the fractional acidic ester are reacted with one mole of the polyethylene glycol, there is no possibility for the formation of polymeric types of esterification products under ordinary conditions.

The hydroxylated compounds employed as reactants in one mode of manufacture of the present compounds, are hydroxylated acylated amino ethers containing:

(a) A radical derived from a basic hydroxyaminoether, and said radical being of the kind containing at least one amino nitrogen free from attached aryl and amido-linked acyl radicals; said hydroxy aminoether radical being further characterized by the presence of at least one radical derived from a basic hydroxyamine and being attached by at least one ether linkage to at least one radical selected from the class consisting of glycerol radicals, polyglycerol radicals, glycol radicals, polyglycol radicals, basic hydroxy amine radicals, amido hydroxyamine radicals, and aryl alkanolamine radicals; said basic hydroxyaminoether radical being characterized by containing not over 60 carbon atoms; and (b) An acyl radical derived from a detergent-forming monocarboxy acid having at least 8 carbon atoms and not more than 32 carbon atoms, said acylated aminoether being additionally characterized by the fact that said aforementioned acyl radical is a substituent for a hydrogen atom of an alcoholic hydroxyl radical.

Such hydroxyacylated aminoethers are obtained by reactions conducted in such a manner as to introduce an acyl radical derived from a monocarboxy detergent-forming acid. Such acids are characterized by having at least 8 and not more than 32 carbon atoms and are exemplified by fatty acids, naphthenic acid, abietic acids, oxidized paraffin or wax acids, or the like, or by simple modifications thereof which do not detract from the ability of the acid to combine with alkali to produce soap or soap-like materials. As to oxidized petroleum acids, see U. S. Patent No. 2,242,837, dated May 20, 1941, to Shields.

Thus, hydrogenated oleic acid, chlorinated naphthenic acid, or brominated abietic acid will form such detergent-forming bodies with the same ease as the parent materials themselves. The oxidized acids obtained by blowing or oxidation of the acids or esters, are satisfactory. Such acids have frequently been referred to collectively in the art as monocarboxy detergent-forming acids. Needless to say, the acylation need not be conducted by means of the acid itself, but may be conducted by means of any compound of the acid which contains the acid radical; for instance, an ester, an amide, an anhydride, an acyl chloride, etc.

Common polyhydric alcohols include the glycols and glycerols. These polyhydric alcohols are characterized by the ease with which two or more molecules combine with elimination of water to form polyglycols, polyglycerols, or the like. These latter compounds are sometimes referred to as ether alcohols, because the typical ether linkage, carbon-oxygen-carbon, appears at least once in such compounds. It is known that certain hydroxyamines, particularly alkanolamines, containing alkanol radicals, enter into the same kind of reaction with the formation of a hydroxylated aminoether. Possibly, the commonest example of an alkanolamine is an ethanolamine, particularly diethanolamine and triethanolamine. It may be well to point out that one of the reactants of intermediate products contemplated for the new composition of matter or demulsifying agent herein described, is derived from basic compounds, i. e., compounds in which the basicity approximates that of the parent hydroxyamine. Such basic amines are characterized by the fact that there is no aryl group directly attached to an amino nitrogen group, unless there be present at least one other amino radical capable of contributing a basic quality. In other words, a hydrogen atom attached to an amino nitrogen atom may remain as such, or may be replaced by an alkyl radical, an alicyclic radical, or an aralkyl radical, or there may be present a hydroxy alkyl radical, a hydroxy alicyclic radical, or a hydroxy aralkyl radical directly attached to the amino nitrogen atom. Furthermore, such hydroxy hydrocarbon radicals may be acylated with lower aliphatic acids containing at least two carbon atoms and not more than 7 carbon atoms. Such acids include acetic acid, butyric acid, heptoic acid. etc. In the event that an amino nitrogen atom appears in which an aryl radical is directly attached to said amino nitrogen atom, as in the case of phenyl diethanolamine, then the presence of such non-basic amino nitrogen atom must be ignored and the compound must contain at least one amino nitrogen atom of a basic character elsewhere in the molecule. Other similar aryl alkanolamines, such as diphenyl ethanolamine, naphthyldiethanolamine, phenyldipropanolamine, etc. may be used, subject to the above-mentioned provision.

In the following table of compounds, the letter T indicates an amino hydrogen atom, or any one of the substituents which have been suggested as satisfactory to replace an amino hydrogen atom. The following table is submitted purely by way of illustration, and indicates only a small portion of the various materials which may be acylated with a detergent-forming monocarboxy acid to provide a component of the demulsifying agents of the kind employed in the present process:

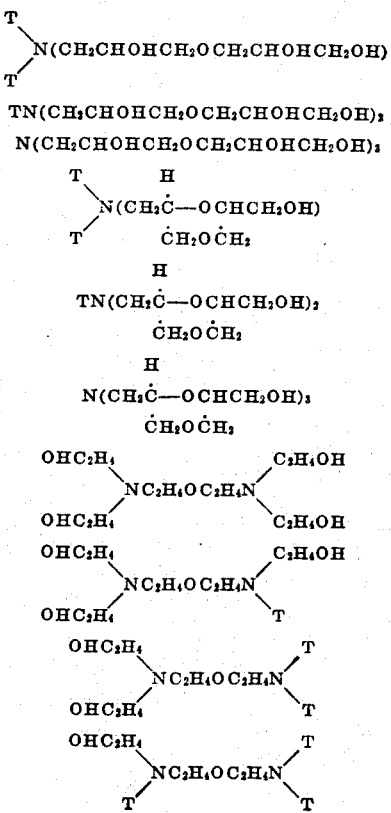

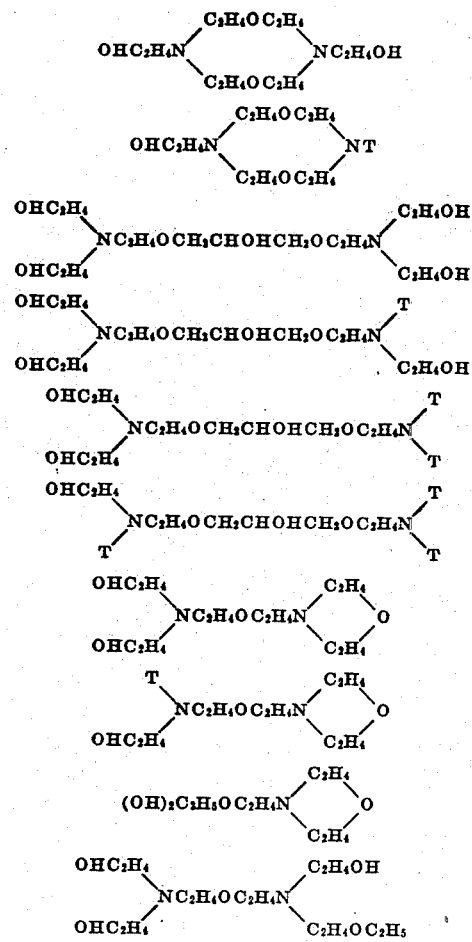

In the above table, it is understood that where the radical C₂H₄ occurs, it may be replaced by any other suitable radical, such as a $C_3H_6$, $C_4H_8$ radical, etc. Furthermore, it may be replaced by a residue from a cyclohexyl radical, or a residue from a benzyl radical or the like. Similarly, where the glycerol radical appears, a homolog may be substituted instead, as, for example, beta-methyl glycerol or the tetrahydroxyl derivative thereof. It is unnecessary to differentiate between isomeric forms; and in some instances, one may have polymeric forms containing a large number of residues derived from polyhydric alcohols or hydroxyamines, and of such a kind that there are present perhaps 20, 30, 40, or even 50 residues from the parent material or materials which contribute to the formation of the final molecule. Continuous etherization is considered as being polymerization, for purposes of convenience. Such polymers may be considered a repetition of the monomer, taken any convenient number of times—for instance, two to twenty times. It is also to be noted that the molecule may be joined by more than one ether linkage in parallel. As previously stated, phenyl diethanolamine or similar compounds may enter into the final molecule. Similarly, morpholine or ethanol morpholine may be employed. Morpholine may be considered as contributing the basic amino nitrogen atom. In each and every instance the intermediate compound or reactant employed in the manufacture of the composition of matter or demulsifier is characterized by having present at least one basic nitrogen atom, i. e., a nitrogen atom unattached to any aryl radical and at least one hydroxylated hydrocarbon radical generally derived from an alkanolamine, or from a glycerylamine, such as monoglycerylamine, diglycerylamine, or triglycerylamine.

As to the manufacture of such intermediate compounds, which are used as reactants to produce the new composition of matter or demulsifiers herein contemplated, one need only point out that some of them are well known compositions of matter. Others can be produced, if desired, in the same manner employed to produce those which are well known. One method of producing such compounds is to heat the desired products under suitable conditions, so as to cause dehydration to take place. Another method is to treat the selected amine with a product such as an alkylene oxide, including ethylene oxide, or with a product such as glycidol. Other methods involving dehydration in the presence of an acidic agent, for instance, dehydration of two moles of diethanolamine so as to produce the ether type compound instead of morpholine, may be employed. It is possible that some of the types indicated above, like other organic compounds, are difficult to prepare, but their derivatives can be prepared more readily. In other words, since an acylated product is desired, it is feasible, in some instances, to prepare the acylated product by uniting a partially esterified polyhydric alcohol with a partially esterified alkanolamine, or by use of an equivalent method. This particular method of producing the desired type of chemical compound or intermediate reactant employed in the manufacture of our new composition of matter or new demulsifier, will be discussed subsequently.

Attention is directed to U. S. Patent No. 2,293,494, to Melvin De Groote and Bernhard Keiser, dated August 18, 1942. This particular patent teaches a convenient method for making some of the compounds or intermediate reactants of the kind previously indicated. The said method involves essentially the conversion of an ethanolamine or the like, such as triethanolamine, into a mono- or dialcoholate, and the reaction of the alcoholate with a halohydrin, such as glycerol chlorhydrin or glycerol dichlorhydrin. The alcoholates may be indicated by the following formulae:

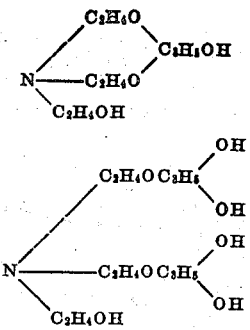

Such alcoholates react so as to liberate the alkali metal halide, such as sodium chloride or potassium chloride. Said patent illustrates, for example, the manufacture of materials of the following type by means of such reaction:

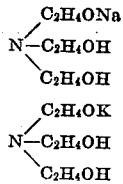

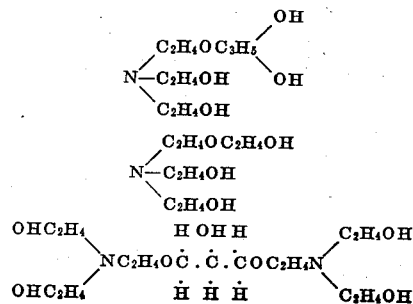

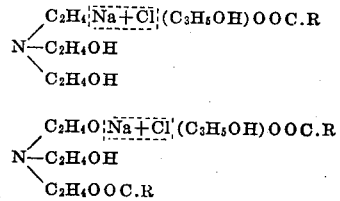

It is to be noted that the chlorhydrin involved may of itself be acylated, and thus compounds are derivable which are characterized by the presence of an acyl radical obtained from acids having either less than 8 carbon atoms, or more than 8 carbon atoms. The following excerpt is taken verbatim from said aforementioned patent:

"It has been previously pointed out that one may obtain acylated derivatives of the amino ethers by use of the acylated alcoholate derived by utilitization of metallic sodium or potassium or the like. In such compounds the acyl radical is attached directly to the tertiary amine residue or radical. However, if one employs an esterified chlorhydrin, i. e., the chlorhydrin derived from monoacetin, monostearin, monoabietin, mononaphthenin, or the like, one obtains a chlorhydrin of the following type:

$$\begin{array}{ccc} H & OH & H \\ Cl.\overset{|}{C}.\overset{|}{C}.\overset{|}{C}.OOC.R \\ H & H & H \end{array}$$

in which R.CO is the acyl radical derived from R.COOH, which represents an acid of the kind previously described. By employing such acylated halohydrin or chlorhydrin, one can use reactants which include reactions of the following composition:

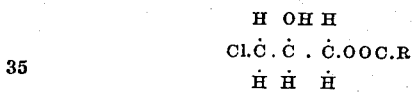

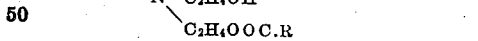

The above reactions can only be conducted in the absence of free alkali."

The following example for preparing a hydroxy aminoether is taken verbatim from said U. S. Patent No. 2,293,494.

"100 pounds of commercial triethanolamine containing 2½% monoethanolamine and 15% diethanolamine, are treated with 135 pounds of a 60% solution of caustic soda (i. e., 80½ lbs. NaOH dissolved in 53 lbs. of water), so as to yield a pasty or semi-solid mass containing substantially no free or relatively little free alkali. The wet mass is then reacted with extreme care, as previously noted, with commercial glycerol monochlorhydrin. After completion of reaction, the sodium chloride formed is separated by filtration and hydraulic pressure. The final product represents a compound of technical purity and has the following composition;

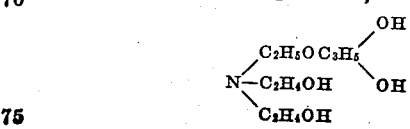

In the hereto appended claims no reference is made to the fact that the alcoholate is employed in substantial absence of alkali, because it is deemed unnecessary to indicate that this condition is the most desirable. The objection to an excess of alkali is the destruction of the chlorhydrin and the formation of a polyhydric alcohol or the like, which appears in the completed product. Naturally, there is no objection to small amounts of excess alkali whose significance is not appreciable. It is to be noted in the claims that no reference is made to separation of the alcoholate from water, excess alkali, unreacted amine, etc., which may be present, although, as previously indicated, such separatory procedure may be followed, if desired."

Having prepared a hydroxyaminoether of the kind previously described, the second step in the manufacture of the intermediate compound employed as a reactant is to acylate such product so as to introduce an acyl radical derived from a detergent-forming monocarboxy acid. For purposes of convenience, such monocarboxy acid may be indicated by the formula R'.COOH and the acyl group by R'.CO. It has already been indicated that acylation may be conducted by use of the acid itself, or by use of any suitable compound containing the acyl radical in labile form.

Attention is directed to U. S. Patents Nos. 2,154,422 and 2,154,423, to De Groote, Keiser and Blair, both dated April 18, 1939. Both of said patents are concerned with products derived by esterification between intermediate amines containing an alcoholic hydroxy group and phthalic anhydride. It is necessary in the instances described in said patents that an alcoholic hydroxyl radical be present in reaction with phthalic anhydride. Insofar that the acylated aminoethers herein contemplated as reactants for the manufacture of demulsifying agents must be esterified with maleic anhydride or the like, it is apparent that an alcoholic hydroxyl radical need be present, and that acyl radicals must be introduced so that there is a residual hydroxyl radical attached either to a hydrocarbon radical, or to an acyl radical, such as a hydroxyl radical which is part of a ricinoleyl radical. Furthermore, it is apparent that even when acylation is accomplished with an acid having no hydroxyl radicals, for instance, stearic acid, oleic acid, naphthenic acid, or the like, then, in that event, one must acylate a hydroxy aminoether having more than one free hydroxyl radical. A person skilled in the art will readily understand how to employ the methods and compounds described in said two aforementioned patents to prepare acylated derivatives from hydroxy aminoethers of the kind above described and the selected detergent-forming monocarboxy acid compound.

Said patents indicate the following amines which may be employed: Diethanolamine, monoethanolamine, ethyl ethanolamine, methyl ethanolamine, propanolamine, dipropanolamine, propyl propanolamine; cyclohexanolamine, dicyclohexanolamine, cyclohexylethanolamine, cyclohexyl propanolamine, benzyl ethanolamine, benzyl propanolamine, pentanolamine, hexanolamine, octyl ethanolamine, octadecyl ethanolamine, cyclohexanol ethanolamine; triethanolamine, diethanolalkylamines, such as diethanol ethylamine, diethanol propylamine; diethanol methylamine, tripropanolamine, dipropanol methylamine cyclohexanol diethanolamine, dicyclohexanol ethanolamine, cyclohexyl diethanolamine, dicyclohexyl ethanolamine, dicyclohexanol ethylamine, benzyl diethanolamine, dibenzyl ethanolamine, benzyl dipropanolamine, tripentanolamine, trihexanolamine, ethyl hexyl ethanolamine, octadecyl diethanolamine, polyethanolamine, mono-, di- and tri-glycerylamine, etc.

Attention is also directed to the two aforementioned patents to the extent that they disclose and describe various glycerylamines and the method of manufacturing the same. Such methods obviously are applicable to derivatives of the kind previously mentioned, such as beta methyl glycerol, beta proply glycerol, beta ethyl glycerol, etc., as well as derivatives of the tetra-hydroxyl compounds obtainable therefrom.

It has been previously pointed out that the chemical compounds employed as intermediates or as reactants for the production of the composition of matter or new type of demulsifier herein contemplated, need not necessarily be manufactured by first preparing the hydroyamino-ether, and subsequently acylating the same. As a matter of fact, in many instances, it is more convenient to acylate the desired polyhydric alcohol or the desired hydroxyamine, and then combine the two acylated molecules or acylate one type of compound and combine with the unacylated molecule of the other type. Indeed, an examination of what has been said previously and an examination of the method suggested hereinafter, indicates that one can proceed to produce a compound in which the acylated radical derived from the detergent-forming radical is produced at whatever point is desired. In other words, it may be introduced only in one or more hydroxyamine residues which are present; or the acyl radical may be introduced only in one or more polyhydric alcohol residues which are present; or it may be introduced both into the hydroxyamino residues which are present and into the polyhydric alcohol residue which is present. As previously pointed out, if desired, the acyl radical may be introduced more than once into the same hydroxyamino residue, or into the polyhydric alcohol residue, provided there are available sufficient alcoholic hydroxyls for such combination.

Acylation, of course, is identical with esterification for the purposes of the present description. In other words, instead of replacing the hydrogen atom of a hydroxyl group by an acyl radical, one can assume that the complete hydroxyl radical has been replaced by an oxyacyl radical; i. e., a fatty acid radical; and thus, the product may be referred to as esterified. Using such nomenclature, one can refer to an alkanolamine as being partially esterified with a selected detergent-forming monocarboxy acid or a polyhydric alcohol as being partially esterified. The manufacture of partially esterified alcohols, such as superglycerinated fats, is well known; and such compounds have considerable utility in the arts. Needless to say, the same method employed for producing superglycerinated fats may be employed in connection with any polyhydric alcohol and may be employed in connection with other acids instead of fatty acids; for instance, the other non-fatty detergent-forming monocarboxy acids, such as abietic acid, naphthenic acid, and the like. In view of this fact, no description is necessary as to the method of preparing partially esterified polyhydric alcohols from detergent-forming acids of the kind described. Furthermore, no description is necessary as to the method of preparing partially esterified alkanolamines, in view of what has been said previously, and particularly in view of the complete description of equivalent acylation procedure, which appears in the aforementioned United States Patents Nos. 2,154,422 and 2,154,423.

Reference is made to U. S. Patent No. 2,228,989, of Melvin De Groote, Bernhard Keiser and Charles M. Blair, Jr., dated January 14, 1941. Said patent describes compounds obtainable by a method which comprises heating a partially esterified tertiary alkanolamine with a polyhydric alcohol to a temperature in excess of 100° C. for a period of time sufficient to cause condensation with elimination of water and the production of an ethereal reaction product. Although said patent is concerned largely with derivatives of fatty acids, needless to say, the same procedure may be applied to comparable compounds derived from naphthenic acid or abietic acid or the like. This is also true in regard to the preparation of subsequent Examples 4-10, inclusive. The following three examples appear in said patent.

"*Example 1 (Example 1 of the patent)*

"Commercial triethanolamine and cocoanut oil, in the proportions of 1 mole of cocoanut oil to 3 moles of triethanolamine are heated to a temperature between about 160° C. and 180° C. for about two hours. The resulting product consists mainly of the mono-fatty acid ester of triethanolamine, with minor proportions of the di-fatty acid ester, the tri-fatty acid ester, glycerin, etc. To this reaction product is added somewhat more than 2 moles of glycerin, and the resulting mixture is heated to a temperature between about 160° C. and 180° C. for about two days. If desired, a current of dry nitrogen or other inert gas may be passed through to speed up the reaction. Condensation occurs between the fatty acid ester of the triethanolamine, and the glycerin, with the production of ethereal reaction products, such as the dihydroxypropyl ether of the mono-fatty acid ester of triethanolamine and other more complex ethereal reaction products."

"*Example 2 (Example 2 of the patent)*

"Triglycerylamine (tri - di - hydroxy - propyl - amine) and castor oil are reacted in the proportions of 3 moles of castor oil to 2 moles of triglycerylamine, with the production of a product consisting predominantly of the di-ricinoleic acid ester of the triglycerylamine. The resulting mixture is further heated for a period of about two days, with condensation between the glycerin and the diricinoleic acid ester of the triglycerylamine, and the production of corresponding ethereal condensation products."

"*Example 3 (Example 3 of the patent)*

"Blown rapeseed oil and diethanolethylamine, in the molecular proportions of 3 moles of the amine to 1 mole of the oil are heated together to a temperature between about 150° C. and 180° C. for about two hours, with the production of a reaction product containing a large proportion of the monoester of the diethanolethylamine, together with unreacted starting material, glycerin, etc. Something in excess of two moles of glycerin are added to the reaction mixture, and the resulting product is heated to about 150° C. to 180° C. for about two days, with the production of ethereal reaction products of glycerin and the monoester of the diethanolethylamine."

Similarly, attention is called to the U. S. Patent No. 2,228,987, of Melvin De Groote, Bernhard Keiser and Charles M. Blair, Jr., dated January 14, 1941. Said patent describes compounds of the kind obtainable by a method which comprises heating the triglyceride, a tertiary alkanolamine having more than one alcoholic hydroxyl radical, and a polyhydric alcohol, to a temperature in excess of 100° C. for a period of time sufficient to cause alcoholysis of a triglyceride and condensation between the resulting partially esterified alkanolamine, and partially esterified glycerine. The following examples appear in said patent:

"*Example 4 (Example 1 of the patent)*

"Commercial triethanolamine, cocoanut oil and glycerin in the proportions of one mole of cocoanut oil to three moles of triethanolamine and at least one mole of glycerin are heated to a temperature of between about 150° and 180° C. for a period of about fifty hours. If desired, a current of dry nitrogen may be passed through the reaction mixture. The resulting product contains a substantial and preponderating amount of the ether resulting from the condensation of the mono-fatty acid ester of triethanolamine and the mono- and di-fatty acid ester of glycerin, shown in the following formula:

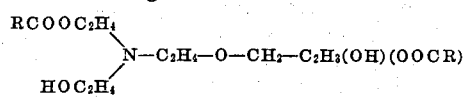

of which R represents the long carbon linked chain of the cocoanut oil fatty acids."

"*Example 5 (Example 2 of the patent)*

"Triglycerylamine (tri - dihydroxy - p r o p y l - amine) and castor oil are reacted in the proportions of three moles of castor oil to two moles of triglycerylamine, for a period of about two hours at a temperature of around 150° to 180° C. To the product so produced, which consists predominantly of the di-ricinoleic acid ester of the triglycerylamine, is added about 50% of the monoricinoleic acid ester of glycerin, and the resulting mixture is heated to about 150° to 180° C. for about two days, with the production of mixed ethers of the di-ricinoleic acid ester of triglycerylamine and the monoricinoleic acid ester of glycerin, of the type formula:

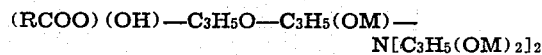

in which two of the M's represent the acyl group corresponding to ricinoleic acid and the other three represent hydrogen, and in which R represents the carbon linked chain characteristic of ricinoleic acid."

"*Example 6 (Example 3 of the patent)*

"Palm kernel oil and diethanolethylamine, in the molecular proportions of three moles of the amine to one mole of the palm kernel oil are heated together with one mole of a polyglycerol to a temperature between about 150° and 180° C. for about two days with the production of a reaction product containing a large proportion of the ether of the mono-fatty acid ester of diethanolethylamine and the monoglyceride corresponding to palm kernel oil, and a large proportion of the ether of the same diethanolethylamine ester and the mono-fatty acid ester of the polyglycerol."

"*Example 7 (Example 4 of the patent)*

"An equimolecular mixture of the mono-acetic acid ester of triethanolamine and the monostearic acid ester of glycerin are heated together for a period of about fifty hours, with the production of a product containing substantial amounts of the ether of the formula:

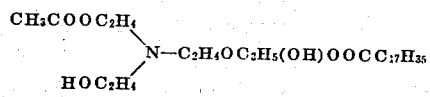

together with more complex ethereal derivatives of the amine and the monoglyceride.

"*Example 8 (Example 5 of the patent)*

"Commercial triethanolamine, a fatty oil and ethylene glycol in the molecular proportions of two moles of the amine to one mole of the oil to one mole of the ethylene glycol are heated to a temperature between about 150° and 180° C. for about two days with the production of a reaction product containing substantial amounts of the ether of the mono-ester of triethanolamine with the corresponding mono-glyceride and the ether of the mono-ester of triethanolamine with the mono-ester of ethylene glycol."

Furthermore, reference is made to U. S. Patent No. 2,228,988, of Melvin De Groote, Bernhard Keiser and Charles M. Blair, Jr., dated January 14, 1941, which describes compounds obtainable by a method which comprises heating a partially esterified tertiary alkanolamine with a tertiary alkanolamine at a temperature to an excess of 100° C. for a period of time sufficient to effect condensation with the production of an ethereal reaction product. The following examples are taken from said patent.

"*Example 9 (Example 1 of the patent)*

"Commercial triethanolamine and cocoanut oil, in the proportions of 1 mole of cocoanut oil to 3 moles of triethanolamine, are heated to a temperature between about 150° C. and 180° C. for a period of about two days. If desired, a current of inert gas, such as dry nitrogen, may be passed through the reaction mixture to speed up the reaction. The resulting product consists mainly of the ether formed by the elimination of a molecule of water from two molecules of the mono-fatty acid ester of triethanolamine, with minor proportions of more complex ethers, ethers of the difatty acid ester of triethanolamine, ethers of the fatty acid esters of triethanolamine with glycerin or mono- or di-glycerides, etc."

"*Example 10 (Example 2 of the patent)*

"The diricinoleic acid ester of triglycerylamine is heated to a temperature between about 150° C. and 180° C. for about two days, with the production of a product consisting mainly of ethers such as di-hydroxypropyl, mono-hydroxypropylamine diricinoleate ether, and more complex ethers formed by the condensation of more than two molecules of the triglycerylamine diricinoleate, etc."

"*Example 11 (Example 3 of the patent)*

"Diethanolamine monoacetate is heated to a temperature between about 150° C. and 180° C. for about two days with the production of a product consisting mainly of the ether of the formula:

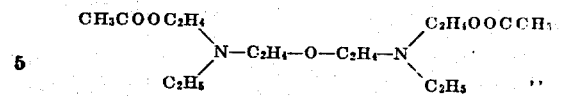

It is to be noted that reference is made to the above four last cited patents in regard to a further elaboration as to various fatty acid esters, i. e., ordinary vegetable oils, fats, and the like, which may be employed, and also as to further description of acceptable hydroxyamines and polyhydric alcohols which may be employed. It must be recognized that the materials have not lost their basicity to any great degree, as compared with the hydroxyamines from which they were originally derived. Esterification or acylation may tend to reduce the basicity to some degree, although in some instances it may even be increased. Such moderate changes are immaterial.

Generally speaking, it is our preference to obtain the intermediate reactants from amines in which there is no hydrogen atom attached to the amino nitrogen atom. In other words, our preference is to use tertiary amines, such as ethyl diethanolamine, diethyl ethanolamine, triethanolamine, etc. Generally speaking, it is our preference to prepare the intermediate reactants from the tertiary amines, in which there is an alkanolamine radical present, particularly an ethanolamine radical present. Furthermore, it is our preference to employ derivatives of glycerol in forming the ether type compound. Particular attention is directed to the types of compounds as prepared according to the directions in the various patents previously referred to. Incidentally, we desire to point out that T, previously referred to, may represent an RCO radical directly attached to the amino nitrogen radical. In other words, the intermediate reactant may also be an amide. The RCO in such instances may be derived from an acid having less than 8 carbon atoms, or from a detergent-forming acid. However, in such instances the basicity of the amino radical will usually disappear in conversion into an amide; and therefore, in such instances, it is usually necessary to have another amino nitrogen atom present which supplies the basicity of the molecule. Such situation is entirely analogous to the presence of an amino nitrogen atom attached to an aryl radical, as in the case of phenyl diethanolamine, previously referred to. There is no objection to any non-basic nitrogen atom contributing part of the molecular weight in the form of an arylamine radical, or in the form of an amido radical, provided that the compound still is basic, due to the presence of some other basic amino nitrogen radical of the kind previously described.

Attention is again directed to the fact that, although the preceding eleven examples are concerned largely with derivatives of unmodified fatty acids, yet the same procedure is also applicable to modified fatty acid compounds manufactured in the manner previously indicated, to wit, so that such modifications are still convertible into soap or soap-like bodies by agency of suitable alkalies. Similarly, one can prepare compounds of abietic acid, naphthenic acid, or modified forms thereof. It is not necessary to prepare the acylated amino-ethers from esters; but if such procedure is desired, then one can first prepare esters from naphthenic acid, abietic acid, or the like, which correspond to naturally-occurring esters; for instance, one can prepare naphthenin, abietin, or the like. We particularly prefer to prepare compounds characterized by the maleate. The reaction may be shown more simply as if involving the acid instead of the anhydride, thus:

HOOC.C₂H₄COOH + HOCH₂(CH₂OCH₂)ₓCH₂OH + HOOC.C₂H₄.COOH presence of at least one, and preferably more than one, hydroxy hydrocarbon group in the final product. Reference is made to the fact that the table appearing in the early part of this application describing a series of representative hydroxy aminoethers, contains certain species in which the ether linkage involved combination with a monohydric alcohol. Such alcohols can vary from methyl through octadecyl, or stearyl, and may be normal or branched. In view of this fact, it must be appreciated that the scope of the compounds contemplated as intermediate reactants in the present application, may be derived from hydroxyamines and monohydric alcohols, as well as hydroxyamines and dihydric alcohols, or from intermolecular reactions of two or more moles of hydroxyamines. As to the manufacture of such alkyl ethers of hydroxyalkylamines, it is to be noted that they can be manufactured by means of conventional methods now employed, or by methods which involve modification of previously described methods; or they may be manufactured by the method described in French Patent No. 832,288, dated September 23, 1938, to Zschimmer & Schwarz, Chemische Fabrik Dölau.

Having obtained such alkyl ethers of hydroxy alkylamines by the method suggested in said aforementioned French Patent No. 832,288, or by any other means, one then acylates such products in the same manner previously described. As has been pointed out previously, our preference is to use fatty acids, particularly the fatty acid compounds, such as esters, because they are readily available in the form of naturally-occurring oils and fats. Among the various desirable glycerides are: Castor oil, olive oil, cottonseed oil, rapeseed oil, fish oil, menhaden oil, corn oil, cocoanut oil, palm oil, palm kernel oil, linseed oil, sunflowerseed oil, teaseed oil, neat's-foot oil, etc. Our preference is that the monomeric chemical compound, exclusive of acyl radicals, shall contain less than 60 carbon atoms, and in most instances, shall contain less than 25 carbon atoms. The acylated amino-ethers used in this invention are either mono- or polyamino bodies, i. e., they contain one or more amino nitrogen atoms. In all preferred cases, they do not contain more than five such nitrogen atoms, and most preferably, they contain two or three such nitrogen atoms.

See also British Patents Nos. 337,774; 306,116; and 337,737.

Having obtained hydroxylated acylated aminoethers of the kind previously described, the next step, of course, is to obtain fractional esters derived from nonaethylene glycol of the kind described in the earlier part of the present disclosure. Such materials may be illustrated by the following examples:

GLYCOL ESTER INTERMEDIATE PRODUCT

Example 1

One pound mole of nonaethylene glycol is reacted with two pound moles of maleic anhydride, so as to form nonaethylene glycol dihydrogen di-

GLYCOL ESTER INTERMEDIATE PRODUCT

Example 2

A mixture of lower non-distillable polyethylene glycols, representing approximately deca- to tetradecaethylene glycol, is substituted for nonaethylene glycol in the preceding example.

GLYCOL ESTER INTERMEDIATE PRODUCT

Example 3

A 50–50 mixture of nonaethylene glycol and lower non-distillable polyethylene glycols of the kind described in the previous example is substituted for nonaethylene glycol in Example 1.

GLYCOL ESTER INTERMEDIATE PRODUCT

Example 4

Adipic acid is substituted for maleic anhydride in Examples 1–3, preceding.

GLYCOL ESTER INTERMEDIATE PRODUCT

Example 5

Oxalic acid is substituted for maleic anhydride in Examples 1–3, preceding.

GLYCOL ESTER INTERMEDIATE PRODUCT

Example 6

Citric acid is substituted for maleic anhydride in Examples 1–3, preceding.

GLYCOL ESTER INTERMEDIATE PRODUCT

Example 7

Succinic anhydride is substituted for maleic anhydride in Examples 1–3, preceding.

The method of producing such fractional esters is well known. The general procedure is to employ a temperature above the boiling point of water and below the pyrolytic point of the reactants. The products are mixed and stirred constantly during the heating and esterification step. If desired, an inert gas, such as dried nitrogen, or dried carbon dioxide, may be passed through the mixture. Sometimes it is desirable to add an esterification catalyst, such as sulfuric acid, benzene sulfonic acid, or the like. This is the same general procedure as employed in the manufacture of ethylene glycol dihydrogen diphthalate. See U. S. Patent No. 2,075,107, dated March 30, 1937, to Frasier.

Sometimes esterification is conducted most readily in the presence of an inert solvent, that carries away the water of esterification which may be formed, although, as is readily appreciated, such water of esterification is absent when the reaction involves an acid anhydride, such as maleic anhydride, and a glycol. However, if water is formed, for instance, when citric acid is employed, then a solvent such as xylene may be present and employed to carry off the water formed. The mixture of xylene vapors and water vapors can be condensed so that the water is separated. The xylene is then returned to the reaction vessel for further circulation. This is a conventional and well known procedure and requires no further elaboration.

Composition of Matter

Example 1

One pound mole of a tertiary ether amine of the following composition:

obtainable by the action of ethylene oxide on triethanolamine, is reacted with one pound mole of ricinoleic acid, so as to obtain the ester of the following composition:

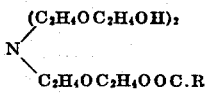

in which RCO is the ricinoleyl radical. In its simplest aspect the aforementioned reaction may be indicated in the following manner:

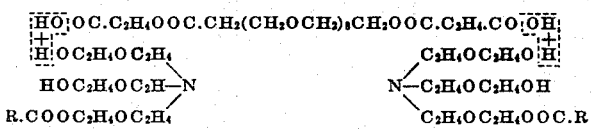

Two pound moles of the ester of the composition immediately preceding are reacted with one pound mole of a glycol ester intermediate product of the kind described under Glycol ester intermediate products, Examples 1, 2 and 3, preceding. Such reaction is continued until all carboxyl acidity has disappeared. The time of reaction may vary from a few hours to as many as 20 hours.

Composition of Matter

Example 2

One pound mole of hydroxyethyl ethylene diamine, is reacted with approximately 5 or 6 pound moles of ethylene oxide to give a diamino type hydroxylated compound. Such compound is reacted with ricinoleic acid and then with the glycol ester intermediate product in the same manner as described in Example 1, preceding.

Composition of Matter

Example 3

An amine of the following composition:

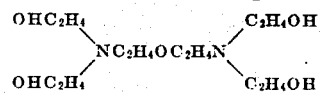

obtained by the etherization of triethanolamine or the treatment of two moles of diethanolamine with one mole of dichloroethyl ether, is reacted in the same manner as described in Composition of matter, Example 1, preceding, with ricinoleic acid, and then with the glycol ester intermediate product.

Composition of Matter

Example 4

An amine of the following composition:

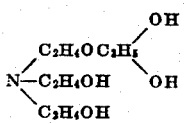

is employed in the same manner as described in the preceding examples.

Composition of Matter

Example 5

An amine of the following composition:

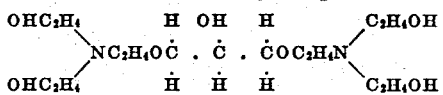

is employed in the same manner as described in the preceding examples.

Composition of Matter

Example 6

Soyabean fatty acids are substituted for ricinoleic acid in Composition of matter, Examples 1–5, preceding.

Composition of Matter

Example 7

Glycol ester intermediate products of the kind exemplified by Examples 4–7, preceding, are substituted for Glycol intermediate products, Examples 1, 2 and 3, in the preceding six examples.

It is to be noted that this second step is an esterification reaction, and the same procedure is employed, as suggested above, in the preparation of the intermediate product. Needless to say, any particular method may be used to produce the desired compounds of the kind indicated. In some instances it may be desirable to conduct the esterification reaction in the presence of a non-volatile inert solvent, which simply acts as a diluent or viscosity reducer.

In the preceding examples, attention has been directed primarily to the monomeric form, or at least, to the form in which the bifunctional alcohol, i. e., a glycol, and the polyfunctional acid, usually a bifunctional compound, react to give a chain type compound, in which the adjacent acid and glycol nucleus occur as a structural unit. For instance, in the monomeric form this may be indicated in the following manner:

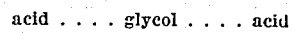

If, however, one prepared an intermediate product employing the ratio of three moles of maleic anhydride and two moles of nonaethylene glycol, the tendency would be to produce a product which might be indicated in the following manner:

Similarly, three moles of the glycol and four moles of the acid might tend to give a combination which may be indicated thus:

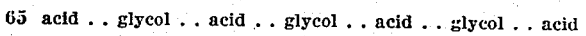

Another way of stating the matter is that the composition may be indicated in the following manner:

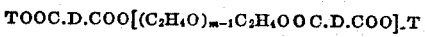

in which the characters have their previous significance and $x$ is a relatively small whole number less than 10, and probably less than 5; and in the monomeric form $x$, of course, is 1. The limitations on the size of $x$ are probably influenced largely by the fact that reaction leading to further growth is dependent upon random contact.

Some of the products are self-emulsifiable oils of self-emulsifiable compounds; whereas, others give cloudy solutions or sols; and the most desirable type is characterized by giving a clear solution in water, and usually in the presence of soluble calcium or magnesium salts, and frequently, in the presence of significant amounts of either acids or alkalies.

Water solubility can be enhanced in a number of ways which have been suggested by previous manufacturing directions, for instance:

(a) By using a more highly polymerized ethylene glycol;

(b) By using a polymeric form instead of a monomeric form in regard to the unit which forms the chain between the two alcoholic nuclei;

(c) By using a polybasic carboxy acid of lower molecular weight, for instance, maleic acid instead of adipic acid;

(d) By using an alcoholic ether amine of a lower molecular weight, or one having more ethereal linkages of more hydroxyl groups, or more basic amino nitrogen atoms.

Indeed, in many instances, the acylated ether amino compound is water-soluble prior to reaction with the glycol ester. It is to be noted that in this instance one is not limited to hydroxylated materials which are water-insoluble prior to reaction with a glycol ester; but they may, in fact, be perfectly water-soluble.

Actually, a reaction involving an alcohol and an acid (esterification) may permit small amounts of either one or both of the reactants, depending upon the predetermined proportion, to remain in an unreacted state. In the actual preparation of compositions of the kind herein contemplated, any residual acidity can be removed by any suitable base, for instance, ammonia, triethanolamine, or the like, especially in dilute solution. Naturally, precaution should be taken, so that neutralization takes place without saponification or decomposition of the ester. In some cases, there is no objection to the presence of the acidic group. Indeed, if a tribasic acid be employed in such a manner as to leave one free carboxyl group, then it is usually desirable to neutralize such group by means of a suitable basic material.

In the hereto appended claims, reference to a neutral product refers to one in which free carboxylic radicals are absent.

Materials of the kind herein contemplated may find uses as wetting, detergent, and leveling agents in the laundry, textile, and dyeing industry; as wetting agents and detergents in the acid washing of fruit, in the acid washing of building stone and brick; as a wetting agent and spreader in the application of asphalt in road building and the like, as a constituent of soldering flux preparations; as a flotation reagent in the flotation separation of various minerals; for flocculation and coagulation of various aqueous suspensions containing negatively charged particles such as sewage, coal washing waste water, and various trade wastes and the like; as germicides, insecticides, emulsifiers for cosmetics, spray oils, water-repellent textile finish, etc. These uses are by no means exhaustive.

However, the most important phase of the present invention, as far as industrial application goes, is concerned with the use of the materials previously described as demulsifiers for water-in-oil emulsions, and more specifically, emulsions of water or brine in crude petroleum.

A somewhat analogous use of our demulsifying agent is the removal of a residual mud sheath which remains after drilling by the rotary method. Sometimes the drilling mud contains added calcium carbonate or the like to render the mud susceptible to reaction with hydrochloric acid or the like, and thus expedite its removal.

Chemical compounds of the kind herein described are also of value as surface tension depressants in the acidization of calcareous oil-bearing strata by means of strong mineral acid, such as hydrochloric acid. Similarly, some members are effective as surface tension depressants or wetting agents in the flooding of exhausted oil-bearing strata.

As to using compounds of the kind herein described as flooding agents for recovering oil from subterranean strata, reference is made to the procedure described in detail in U. S. Patent No. 2,226,119, dated December 24, 1940, to De Groote and Keiser. As to using compounds of the kind herein described as demulsifiers, or in particular as surface tension depressants, in combination with mineral acid or acidization of oil-bearing strata, reference is made to U. S. Patent No. 2,223,383, dated February 25, 1941, to De Groote and Keiser.

It will be apparent to those skilled in the art that residual carboxyl acidity can be eliminated by esterification with a low molal alcohol, for instance, ethyl, methyl, or propyl alcohol, by conventional procedure, so as to give a substantially neutral product. The introduction of such low molal hydrophobe groups does not seriously affect the solubility, and in some instances, gives increased resistance, to soluble calcium and magnesium salts, for such property is of particular value. Usually, however, neutralization with a dilute solution of ammonia or the like is just as practicable and less expensive.

In the hereto appended claims, it is intended that the monomeric forms contemplate also the polymeric forms, insofar that the polymeric forms are nothing more or less than a repetition of the monomeric forms several times over, with the loss of one or more moles of water. The simplest compound herein contemplated is the octanoic acid ester of the following previously illustrated amine:

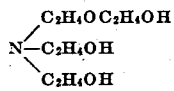

Such, ester, which is illustrated by the following formula:

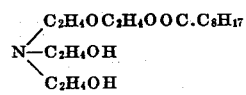

has a molecular weight of 301. On the other hand, as previously pointed out, hydroxyaminoethers having a plurality of hydroxyl groups may be reacted with acids having as many as 32 carbon atoms, and thus the upper molecular weight range may be approximately 3,000 or higher. As has been emphasized, the products are basic in nature, i. e., contain a basic amino nitrogen atom. Reference to a basic amino nitrogen atom is used in its conventional sense. "Unsaturated groups, or negative groups, if substituted for one or more of the hydrogens or ammonia, reduce the basicity of the nitrogen atom to a remarkable degree. In general, the presence of one negative group linked on the nitrogen is sufficient to destroy the ordinary basic properties." (Textbook of Organic Chemistry, Richter, 2nd edition, page 253.)

Re-examination of the prior formulas showing the composition of the hydroxylated acylated basic aminoethers indicates there may be present at least four alcoholic hydroxyl radicals available for esterification with nonaethyleneglycol dihydrogen dimaleate, or the like. Thus, momentarily, it is more convenient to consider such hydroxylated compound as an alcohol, thus:

wherein $R_5$ is the hydroxylated acylated basic aminoether alcohol residue and $m'$ represents a small whole number varying from 1 to 4.

The hydroxylated, acylated aminoether radical $R_5$ having at least one occurrence of the radical

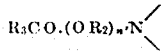

in which $R_3CO$ is the acyl radical of a monocarboxy detergent-forming acid having at least 8 and not more than 32 carbon atoms; the amino nitrogen atom is basic; $R_2$ is a polyalkylene radical or its equivalent, such as hydroxy polyalkylene in which the alkylene radical have at least 2 and not over 10 carbon atoms, and $n'$ is a small whole number varying from 1 to 10, the molecular weight of said compound in monomeric form being from in excess of 300 to approximately tenfold such value, and the basic hydroxy aminoether radical unattached to the acyl radical containing not over 60 carbon atoms.

What has just been said can be recapitulated and presented in more formal agreement with customary nomenclature in the following manner: As stated previously, in the broadest aspect, the polyalkylene glycols employed may be indicated by the following formula:

$$OH(C_nH_{2n}O)_mH$$

in which $m$ has its previous significance, and $n$ represents a numeral varying from 2 to 4, and $m$ varies from 7 to 17. In simpler form this structure can be indicated in the following manner:

$$HO-R-OH$$

in which the divalent radical $RO$ is the divalent radical $(C_nH_{2n}O)_m$, as previously defined.

The dibasic acid previously referred to, in its simplest form as $HOOC.D.COOH$ is more completely portrayed by the following formula:

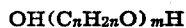

in which $R_1$ is the polybasic carboxy acid residue, except in the unique case of oxalic acid, and $q$ is the numeral 0 or 1, depending on whether or not the polybasic acid is dibasic or tribasic.

If the polybasic acid just described is indicated by $R'$, and if the glycol just described is indicated by $R''$, then the acidic or fractional ester previously described earlier in the specification may be indicated by the following formula:

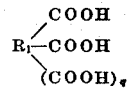

in which $p$ and $p'$ represent numerals varying from 1 to 10, and $n''$ represents a numeral varying from 1 to 20, and $R'$ and $R''$ have their prior significance, and the ratio of $p$ to $p'$ varies from 2:1 to $p+1:p'$, with the obvious proviso that such ester must contain at least two free carboxyl radicals.

The new composition of matter herein contemplated is best represented as an ester obtained by the esterification reaction involving the acidic fractional ester above described and the hydroxylated acylated basic aminoetheralcohol previously depicted in detail. The final composition may be obtained in any suitable manner and would properly represent the final product, regardless of the succession of the intermediate steps. So portrayed, the structural formula is as follows:

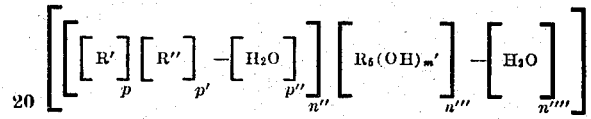

in which all of the characters have their prior significance, and $n''$ represents a numeral varying from 1 to 4, and $n'''$ represents a numeral varying from 1 to 4, and $n''''$ represents a numeral varying from 1 to 4.

It has previously been pointed out in the specification that any residual carboxylic radicals, and especially one obtained from tribasic acids, could be neutralized with a variety of suitable basic materials. In other words, a residual carboxylic hydrogen atom may be replaced by a metallic atom, an ammonium radical, or substituted ammonium radical, as previously indicated. Under such circumstances, any residual carboxylic radical, instead of appearing thus: $COOH$, may, in essence, be the radical $COOR_6$ in which $R_6$ represents a cation including the acidic hydrogen atom. This can be best disposed of by rewriting the formula for the polybasic carboxy acid, thus:

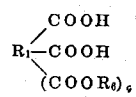

in which all of the characters have their prior significance.

Having thus described our invention, what we claim as new and desire to secure by Letters Patent is:

1. A water-soluble ester of the formula:

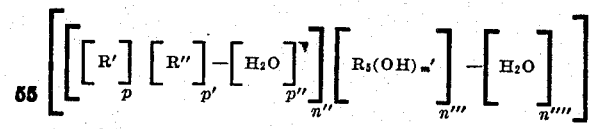

in which $n''$ represents a numeral varying from 1 to 4, $n'''$ represents a numeral varying from 1 to 4, and $n''''$ represents a numeral varying from 1 to 4, and in which $p$ and $p'$ represent numerals varying from 1 to 10, and the ratio of $p$ to $p'$ varies from 2:1 to $p+1: p'$, and $p''$ represents a numeral varying from 1 to 20, and $R'$ is a glycol of the formula $HO-R-OH$ in which the divalent radical $-RO-$ is the divalent radical $-(C_nH_{2n}O)_m-$ in which radical, in turn $n$ represents a numeral varying from 2 to 4 and $m$ represents a numeral varying from 7 to 17; $R''$ is the polycarboxy acid

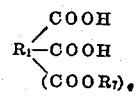

in which $R_1$ is the polycarboxy acid residue, and $R_7$ is a cation, and $q$ is the numeral 0 or 1:

is a hydroxylated acylated basic aminoether alcohol in which $R_5$ is a hydroxylated acylated basic aminoether alcohol residue, and $m'$ represents a small whole number varying from 1 to 4; the hydroxylated acylated aminoether radical $R_5$ having at least one occurrence of the radical $R_3CO.(OR_2)_{n'}N$ in which $R_3$ is the acyl radical of a monocarboxy detergent-forming acid having at least 8 and not more than 32 carbon atoms; the amino-nitrogen atom is basic; $R_2$ is a polyalkylene radical in which the alkylene residue has at least 2 and not over 10 carbon atoms, and $n'$ is a small whole number varying from 1 to 10; and the basic hydroxyaminoether radical calculated as unattached to the acyl radical containing not over 60 carbon atoms.

2. A water-soluble ester, as defined in claim 1, wherein all occurrences of $q$ are 0.

3. A water-soluble ester, as defined in claim 1, wherein all occurrences of $q$ are 0, and $n$ represents the numeral 2.

4. A water-soluble ester, as defined in claim 1, wherein all occurrences of $q$ are 0, $n$ represents the numeral 2, and $m$ represents a numeral varying from 7 to 11.

5. A water-soluble ester, as defined in claim 1, wherein all occurrences of $q$ are 0, $n$ represents the numeral 2, $m$ represents a numeral varying from 7 to 11, and $R_4CO$ is an 18 carbon atom fatty acid residue.

6. A water-soluble ester, as defined in claim 1, wherein all occurrences of $q$ are 0, $n$ represents the numeral 2, $m$ represents a numeral varying from 7 to 11, $R_4CO$ is an 18 carbon atom fatty acid residue, and the ratio of $p$ to $p'$ is 2 to 1.

7. A water-soluble ester, as defined in claim 1, wherein all occurrences of $q$ are 0, $n$ represents the numeral 2, $m$ represents a numeral varying from 7 to 11, $R_4CO$ is an 18 carbon atom fatty acid residue, the ratio of $p$ to $p'$ is 2 to 1, and with added neutralization of all residual acidity.

8. A water-soluble ester, as defined in claim 1, wherein all occurrences of $q$ are 0, $n$ represents the numeral 2, $m$ represents a numeral varying from 7 to 11, $R_4CO$ is a ricinoleic acid residue, the ratio of $p$ to $p'$ is 2 to 1, and with added neutralization of all residual acidity.

9. A water-soluble ester, as defined in claim 1, wherein all occurrences of $q$ are 0, $n$ represents the numeral 2, $m$ represents a numeral varying from 7 to 11, $R_4CO$ is a ricinoleic acid residue, the ratio of $p$ to $p'$ is 2 to 1, with added neutralization of all residual acidity, and $R_1$ is an adipic acid residue.

10. A water-soluble ester, as defined in claim 1, wherein all occurrences of $q$ are 0, $n$ represents the numeral 2, $m$ represents a numeral varying from 7 to 11, $R_4CO$ is a ricinoleic acid residue, the ratio of $p$ to $p'$ is 2 to 1, with added neutralization of all residual acidity and $R_1$ is a succinic acid residue.

11. A water-soluble ester, as defined in claim 1, wherein all occurrences of $q$ are 0, $n$ represents the numeral 2, $m$ represents a numeral varying from 7 to 11, $R_4CO$ is a ricinoleic acid residue, the ratio of $p$ to $p'$ is 2 to 1, with added neutralization of all residual acidity and $R_1$ is a maleic acid residue.

12. In the manufacture of the esterification product described in claim 1, the steps of: (A) esterifying a polyalkylene glycol having at least 7 and not more than 17 ether linkages; and the alkylene radical thereof containing at least 2 and not more than 6 carbon atoms, with a polybasic carboxy acid having not more than 6 carbon atoms in the predetermined ratio of more than 1, and not more than 2 moles of the polybasic acid for each mole of the glycol, to produce a water-soluble product; (B) esterifying one molal proportion of said alkylene glycol dihydrogen acid ester with 2 moles of a hydroxylated acylated amino ether containing: (a) a radical derived from a basic hydroxyaminoether, and said radical containing at least one amino nitrogen free from attached aryl and amido-linked acyl radicals; said hydroxyaminoether radical being further characterized by the presence of at least one radical derived from a basic hydroxyamine and being attached by at least one ether linkage to at least one radical selected from the class consisting of glycerol radicals, polyglycerol radicals, glycol radicals, polyglycol radicals, basic hydroxyamine radicals, amido hydroxyamine radicals, and aryl alkanolamine radicals; said basic hydroxyaminoether radical being characterized by containing not over 60 carbon atoms; and (b) an acyl radical derived from a detergent-forming monocarboxy acid having at least 8 carbon atoms and not more than 32 carbon atoms, said acylated aminoether being additionally characterized by the fact that said aforementioned acyl radical is a substituent for a hydrogen atom of an alcoholic hydroxyl radical.

MELVIN DE GROOTE.
BERNHARD KEISER.